(12) United States Patent
Antonijevic et al.

(10) Patent No.: US 7,836,944 B2
(45) Date of Patent: Nov. 23, 2010

(54) MULTICHANNEL FLAT TUBE FOR HEAT EXCHANGER

(75) Inventors: Dragi Antonijevic, Cologne (DE); Hanskarl Hoffmann, Cologne (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1054 days.

(21) Appl. No.: 11/589,021

(22) Filed: Oct. 27, 2006

(65) Prior Publication Data

US 2007/0096611 A1     May 3, 2007

(30) Foreign Application Priority Data

Oct. 27, 2005    (DE) .................. 10 2005 052 683

(51) Int. Cl.
    *F28F 1/00*     (2006.01)
    *F28F 13/00*     (2006.01)
(52) U.S. Cl. .................. 165/177; 165/135; 138/38
(58) Field of Classification Search .............. 165/177, 165/140, 135; 38/38, 40, 45
See application file for complete search history.

(56) References Cited

U.S. PATENT DOCUMENTS

| 5,009,262 A | * | 4/1991 | Halstead et al. ............. 165/140 |
| 5,186,243 A | | 2/1993 | Halstead |
| 5,186,244 A | | 2/1993 | Joshi |
| 5,605,191 A | * | 2/1997 | Eto et al. ................ 165/176 |
| 6,202,741 B1 | * | 3/2001 | Demuth et al. ............ 165/176 |
| 6,343,645 B1 | * | 2/2002 | Baumann et al. ........... 165/140 |
| 6,536,517 B2 | * | 3/2003 | Hoshino et al. ............ 165/176 |

FOREIGN PATENT DOCUMENTS

| DE | 101 50 213 A1 | 10/2001 |
| DE | 103 46 032 A1 | 2/2003 |
| EP | 1 298 401 A2 | 2/2003 |
| JP | 61110887 A | 5/1986 |
| JP | 2003121092 A | 4/2003 |
| JP | 2003207294 A | 7/2003 |
| JP | 2004125352 A | 4/2004 |

* cited by examiner

*Primary Examiner*—Tho v Duong
(74) *Attorney, Agent, or Firm*—Fraser Clemens Martin & Miller LLC; J. Douglas Miller

(57) ABSTRACT

The invention relates to a multi-channel flat tube for heat exchangers that contains at least two channels extending along its length and arranged essentially adjacent to each other along its width passable by fluid, or at least two channel sections formed by one or several of said channels, whereby between the channels or the channel sections over the length of the flat tube one region of reduced heat transmission in each case is provided, characterized by that the region of reduced heat transmission is defined by a connecting web and isolating channels arranged on both sides of the connecting web. The transverse heat conduction within the flat tube is reduced by this arrangement.

4 Claims, 5 Drawing Sheets

MULTICHANNEL FLAT TUBE FOR HEAT EXCHANGER

CROSS-REFERENCE TO RELATED APPLICATION

This application claims priority to German Patent Application Serial Number 102005052683.7, filed Oct. 27, 2005, the entire disclosure of which is hereby incorporated herein by reference.

FIELD OF THE INVENTION

The invention relates to a multi-channel flat tube for heat exchangers that is particularly used in refrigeration plants and heat pumps working with high-pressure refrigerants.

BACKGROUND OF THE INVENTION

Multi-channel flat tubes and heat exchangers containing such tubes are known in the art. In DE 100 07 159 A1 a cooler and evaporator tube is disclosed that is characterized by a special cross-section of the channels in the flat tube. The number of channels in the flat tube is not given more precise, these channels extending in longitudinal direction of the flat tube.

Further, to DE 197 19 260 C1 a stamped flat tube is known in the art that also consists of several channels and is equipped with additional webs the deformation of which yields a more turbulent flow profile in the channels. Again the channels extend in longitudinal direction of the flat profile.

The heat exchanger configured of such flat tubes combined with fins is passed by air on cross-flowing principle.

Thus the flat tube is transversely passed around. As the flat tube is usually formed of a material that is a good heat conductor, heat conduction along the width of the flat tube inevitably occurs. Reducing the heat transfer efficiency, this proportion of heat transport is not desirable.

The losses are even raised by that neighboring channels of the flat tube are passed in opposite flow directions. The refrigerant flows in opposite flow directions at least once, or several times. Hence high temperature differences can occur between neighboring flow channels that cause high heat conduction losses between the flow channels. Manufacture of heat transfer devices with separate flat tubes that are series-connected in direction of the air flow and have no contact surfaces to each other is very expensive.

The known flat tubes according to the generic term feature high transverse heat conduction and for that reason, are not really suitable for heat transfer devices working on cross flow principle.

From U.S. Pat. No. 5,186,244 a multi-channel flat tube to the generic term is known that is intended to overcome the disadvantage of transverse heat conduction by that the material is tapered to define a web and by indentation of this web. Particularly disadvantageous is the reduced static loadability of said multi-channel flat tube that makes the tube become unstable. Also the increased space requirement of a too wide web is not desired.

The invention is intended to solve the problem to further develop a multi-channel flat tube according to the generic term such that heat exchangers manufacturable of it, particularly cross flow heat exchangers, are characterized by higher heat transfer efficiency while maintaining the mechanical stability of the multi-channel flat tubes.

SUMMARY OF THE INVENTION

According to the invention the problem is solved by the objects of the independent claims. The subclaims disclose advantageous embodiments of the invention.

A solution of the problem is a multi-channel flat tube for heat exchangers that contains at least two channels passable by fluid that extend essentially along the length of the tube and are arranged adjacent to each other along its width, or that contains at least two channel sections defined by one or several of said channels, whereby between the channels or the channel sections over the length of the flat tube one region with reduced heat transmission is provided in each case. The solution is characterized by that the region with reduced heat transmission is defined by a connection web and isolating channels arranged on both sides of the connection web.

An alternative solution of the problem consists in that the multi-channel flat tube of the generic term is characterized by that the region with reduced heat transmission is configured as a meander-shaped connection web.

Another alternative solution of the problem consists in that the multi-channel flat tube is characterized by that the region with reduced heat transmission is configured as constrictions located opposite to each other and an isolating channel arranged between these constrictions.

A further alternative embodiment realizing the principle of the invention is to design the multi-channel flat tube such that the region with reduced heat transmission is configured as recesses arranged after each other in longitudinal extension with connecting webs arranged between the recesses.

Equally advantageous and solving the problem of the invention, a multi-channel flat tube is designed characterized by that the region with reduced heat transmission is configured as constrictions located opposite to each other and recesses arranged in the constrictions with connecting webs arranged between the recesses.

Also an alternative solution of the problem of the invention is a multi-channel flat tube for heat exchangers that is characterized by that the region with reduced heat transmission is configured as an isolating channel with reduced wall thickness towards the multi-channel flat tube.

Advantageously, the multi-channel flat tubes according to the generic term are configured such that the channel sections are established as equal or different numbers of channels.

In the same way, dependent on the density of the fluid passing the channels, the channel sections can feature different cross-section magnitudes for the passage of the fluid so that within one heat exchanger package various heat transfer tasks can be carried out.

In an embodiment of the invention, the height of the flat tube is designed lower in channel sections with a smaller passable cross-section compared to channel sections with a bigger passable cross-section.

According to the teachings of the invention, the heat-conducting surfaces in the cross-section between the flow channels are to be designed as small as possible, in particular if there are big temperature differences between the neighboring channels or channel sections.

Hereby, for example, the channels of the flat tube are passed through by the refrigerant while the flat tube itself along its width is passed around by a fluid such as air. Thus, for heat transmission, cross flow between the fluids frequently results.

Within the flat tube, in the single channels the fluid flows in co-current or counter-current flow. Also the fluid flow passing around the flat tube is configurable as co-current or counter-current flow.

The advantages of the invention are that by reducing the material cross-section in the flat tube, heat conduction along the flow direction of the fluid that passes around the flat tube along its width is reduced. That yields significantly enhanced heat transmission efficiency.

DESCRIPTION OF THE DRAWINGS

Further details, features and advantages of the present invention will become apparent from consideration of the following description of examples of embodiment when taken in connection with the accompanying drawings. It is shown by FIG. 1 a cross-sectional view of a multi-channel flat tube with a region of reduced heat transmission, with connecting web and two isolating channels.

DESCRIPTION OF THE PREFERRED EMBODIMENT

Figure 1:
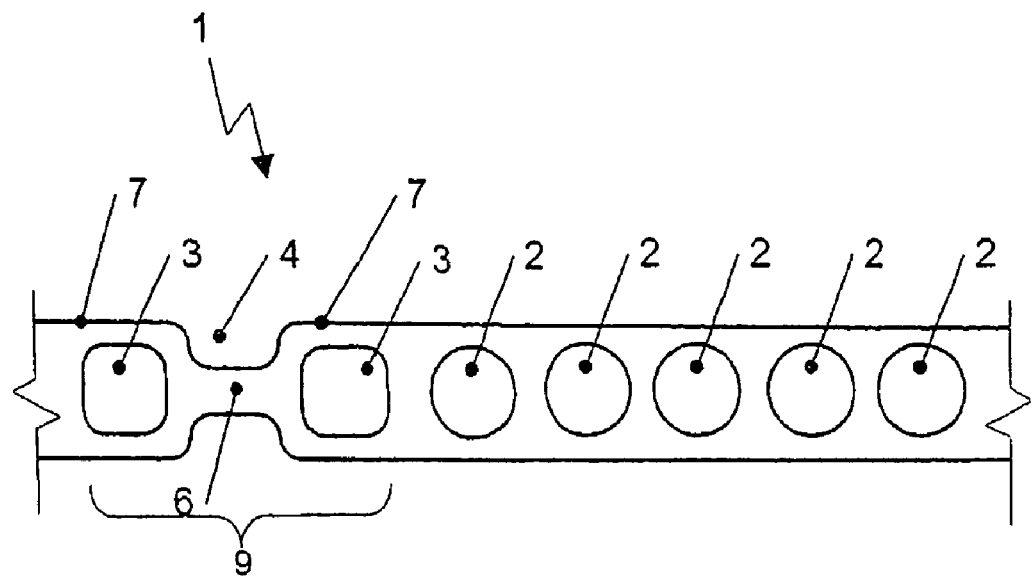

In FIG. 1, a cross-sectional view of a multi-channel flat tube 1 with a region of reduced heat transmission with connecting web and two isolating channels is shown. The multi-channel flat tube 1 is shown only in parts of its cross-section to identify the peculiarities of the region of reduced heat transmission 9. The region of reduced heat transmission 9 separates the channel sections 7 from each other. To ensure particularly efficient separation, constrictions 4 are provided in the multi-channel flat tube 1 that lead to formation of the connecting web 6. This measure is completed by use of two isolating channels 3 that are located on both sides of the connecting web 6, together with the constrictions 4 forming the region of reduced heat transmission 9.

Figure 2:
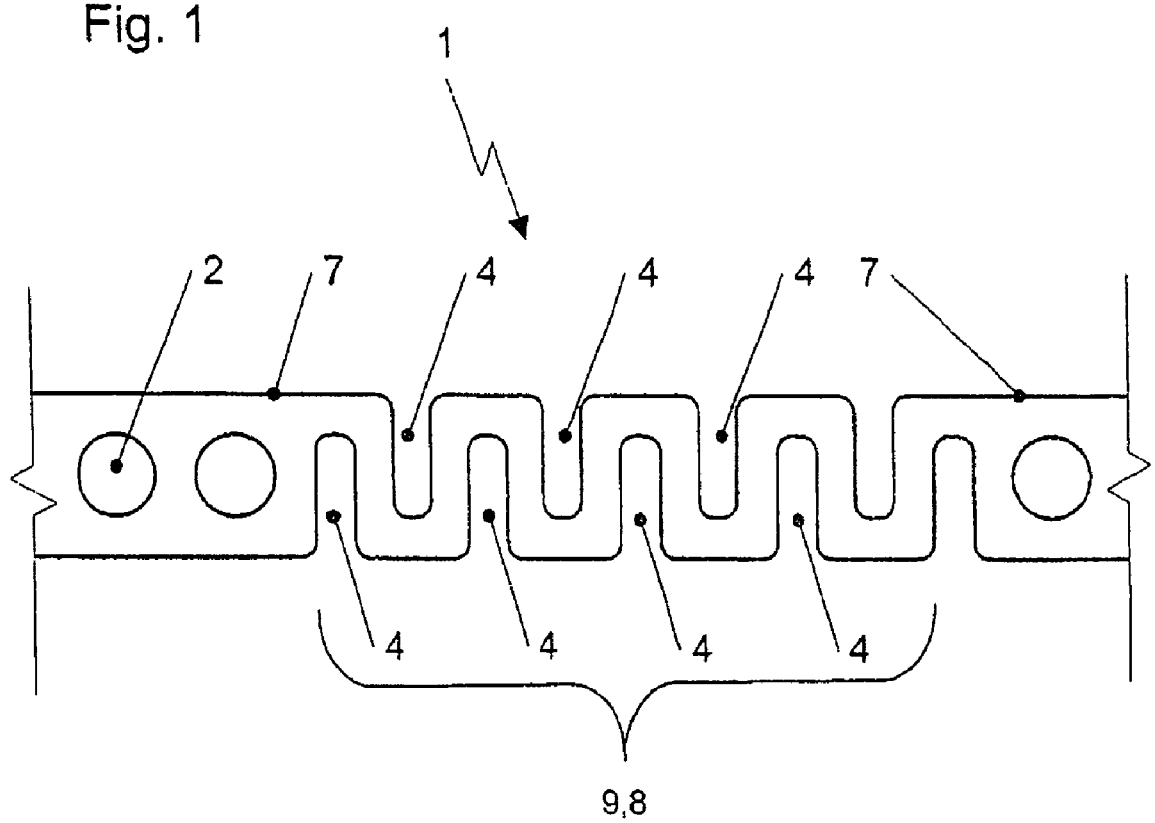
FIG. 2 a cross-sectional view of a multi-channel flat tube with a region of reduced heat transmission, with meander-shaped connecting web.

In FIG. 2, as an alternative design, the region of reduced heat transmission 9 is configured as a meander-shaped connecting web 8. Here for separating the channel sections 7 with the respective channels 2, the multi-channel flat tube 1 is provided with constrictions 4 arranged alternating so that a connecting web 8 is created that is configured meander-shaped or serpentine.

Here, the multi-channel flat tube 1 is constricted between the channels 2 or the channel sections 7. Again the constriction 4 results in reduced material cross-section and hence, also in increased heat conduction resistance. To be ideal, the remaining material thickness of the multi-channel flat tube 1 at the place of the constrictions 4 is dimensioned smallest possible still enabling the total profile to be sufficiently strong for transport and processing. As used herein, a constriction is referred to as a material reduction regarding the height of the multi-channel flat tube 1. That can be obtained in different ways.

It is particularly advantageous to form the constriction during the extrusion process of the multi-channel flat tube 1.

Alternatively, it is advantageous for the stability if the constriction is produced by processing after the extrusion, in particular in such a way that webs remain in longitudinal direction that lead to enhanced stability under bending load in transverse direction. In case of temperature differences between the channel sections 7, the heat flow will partly be dissipated into the environment due to the larger surface area of the connecting web 6 so that the temperature difference of the channel sections will be bigger than for a smaller surface area of the connecting web 6.

Figure 3:
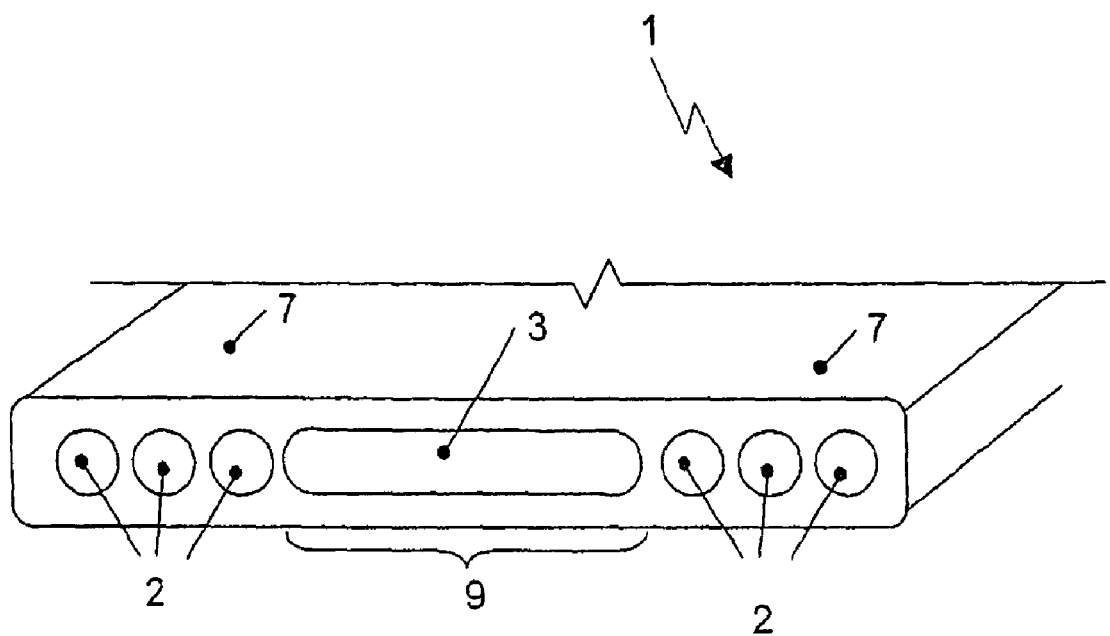
FIG. 3a a perspective and cross-sectional view of a multi-channel flat tube with a wide isolating channel.
FIG. 3b a perspective and cross-sectional view of a multi-channel flat tube with constrictions and isolating channels.
Figure 3:
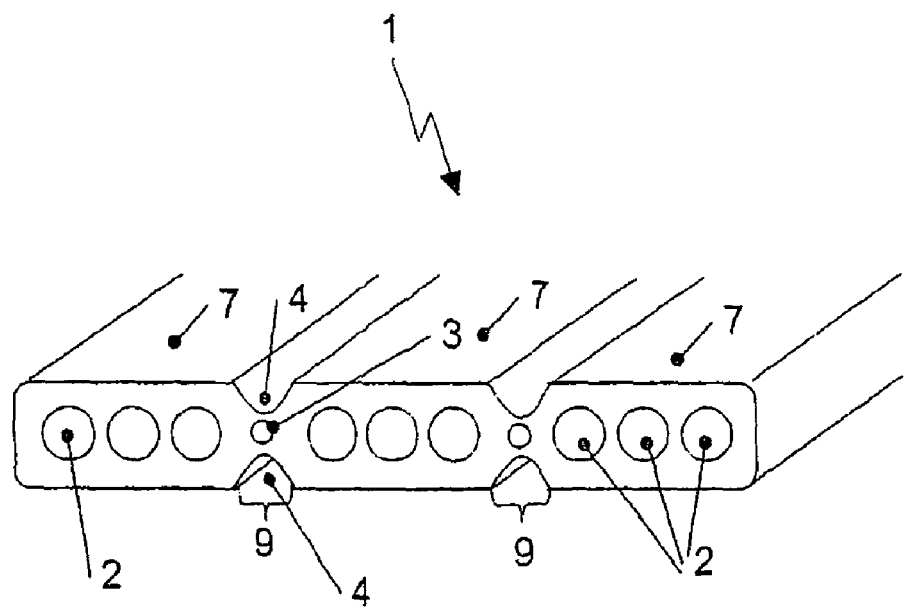

FIG. 3a shows a perspective and cross-sectional view of a multi-channel flat tube with wide isolating channel 3. Here, the region of reduced heat transmission 9 is formed by an isolating channel 3 which according to the embodiment shown, is approximately equal up to three to five times the diameter of a channel 2 in the width of the region of reduced heat transmission 9. That enables reaching thermal separation of the channel sections 7 from each other in a particularly efficient manner, whereby the stability of the multi-channel flat tube 1 is only negligibly reduced.

To FIG. 3b, the invention is advantageously performed by a combination of an isolating channel 3 and a constriction 4. This design yields, for minimal material cross-section and hence highest heat conduction resistance, optimal stability of the multi-channel flat tube 1. The region of reduced heat transmission 9 is only very small, which is advantageous for a compact design of a heat exchanger manufactured by use of the multi-channel flat tube 1.

In the above examples the material cross-section at the places reduced by a constriction 4 or an isolating channel 3 is constant along the length L of the multi-channel flat tube 1.

Figure 4:
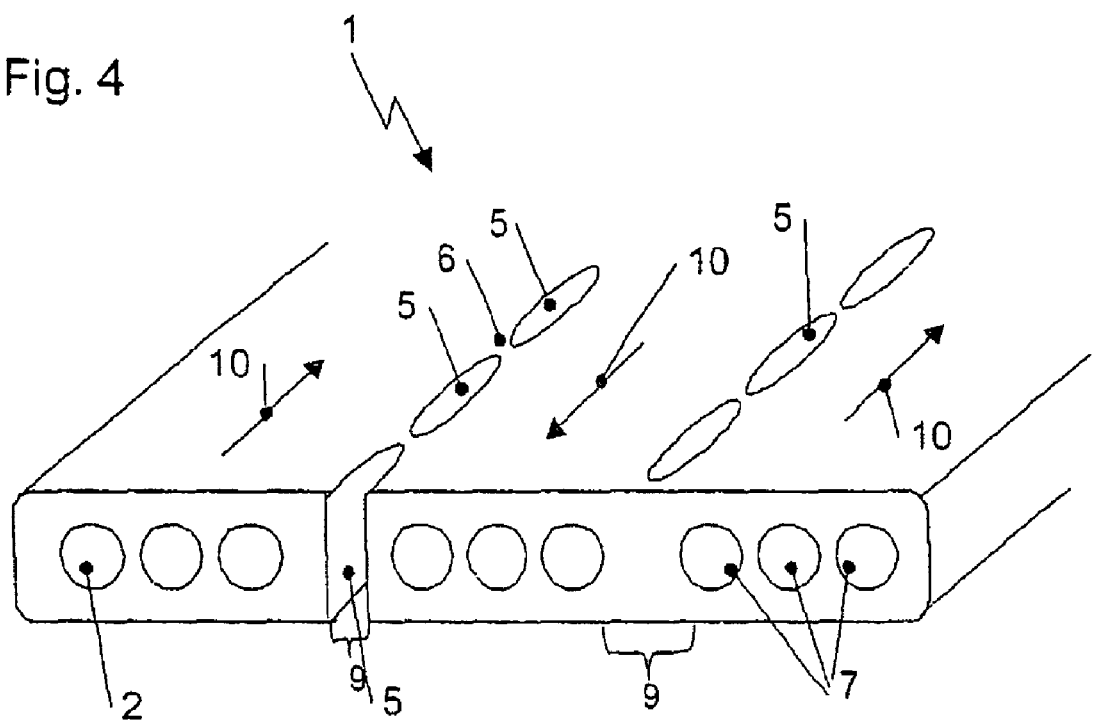
FIG. 4 a perspective and cross-sectional view of the flat tube with recesses.

To FIG. 4 the material cross-section is totally interrupted on part of the length L of the multi-channel flat tube 1 by recesses 5. Along the length L only connecting webs 6 remain to hold together the channel sections 7 and to ensure the stability of the multi-channel flat tube 1.

The recesses 5 between the channel sections 7 are made in the multi-channel flat tube 1 in any form and by any manufacturing process, in the case presented, for example, by blanking of the recesses 5. Also manufacture methods such as water jet cutting or laser cutting are advantageously usable for making the recesses. The shape of the recesses 5 is slot-like, whereby a particularly advantageous embodiment is formed by that ellipsoidal slots between the channel sections 7 are made.

Hereby the recesses 5 are made as long as possible parallel to the channel sections 7 and the remaining connecting webs 6 between the recesses 5 held as small as possible such that the multi-channel flat tube 1 features just sufficient stability for transport and processing.

Figure 5:
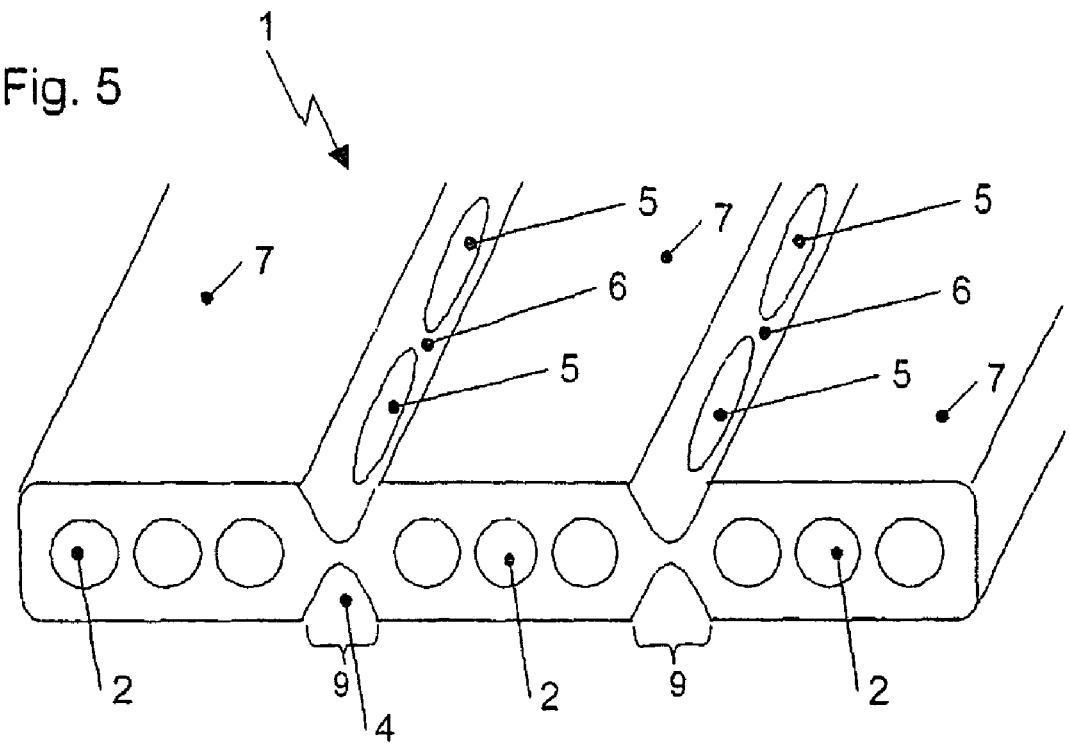
FIG. 5 a perspective and cross-sectional view of the flat tube with constrictions and recesses.

FIG. 5 shows a combination of features. The multi-channel flat tube 1 has channel sections 7 with several channels 2 that are separated from each other by constrictions 4. In the constrictions 4 along the length of the multi-channel flat tube 1, recesses 4 are provided such that the channel sections 7 are separated by connecting webs 6 that are located in the region of the constrictions 4 and hence establish especially low heat transfer and heat transmission. That produces the advantageous embodiment represented of the multi-channel flat tube 1 according to the invention.

By adapting the flow cross-sections in the individual channel sections 7, the flow velocity and pressure loss of the fluid flowing in the flat tube can be optimized.

Figure 6:
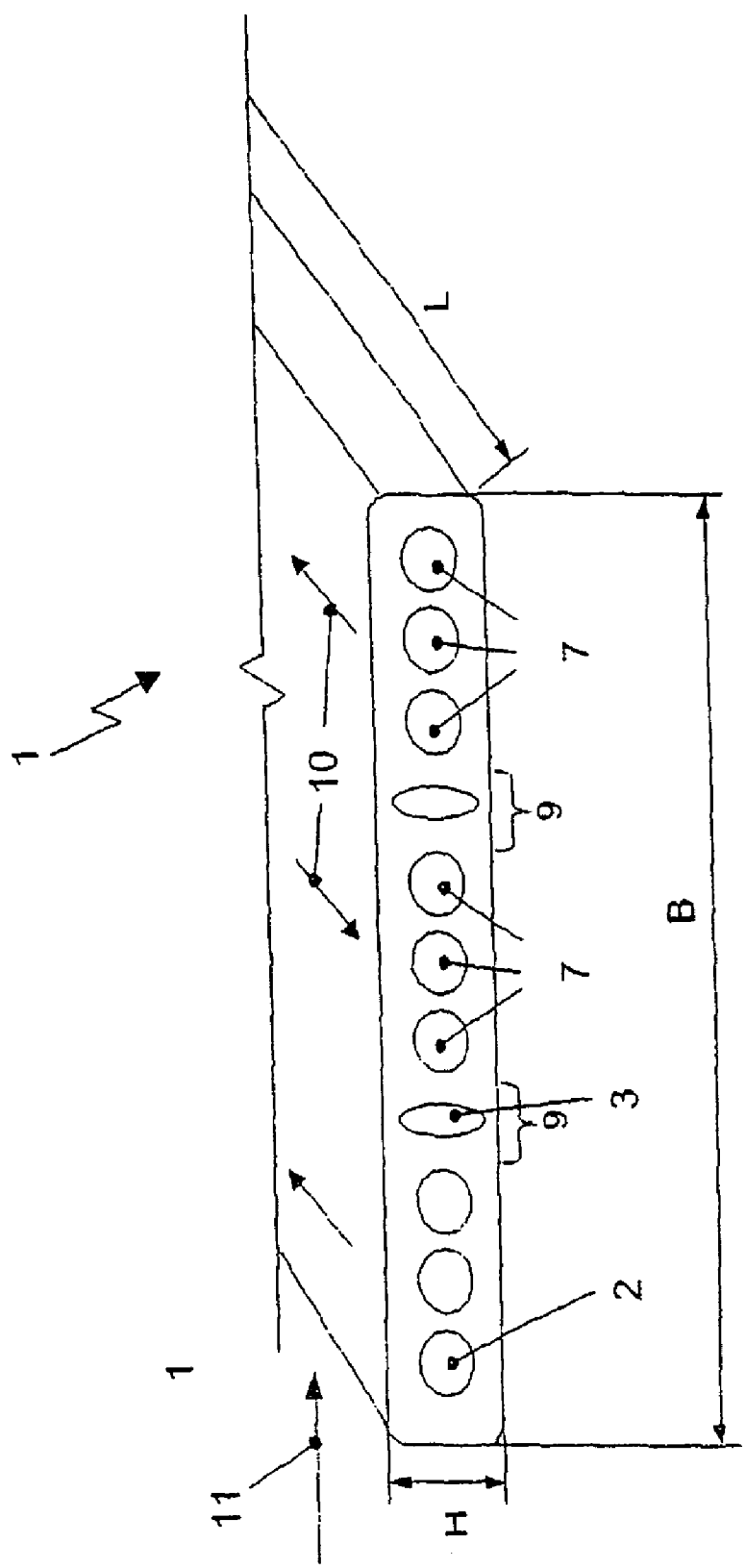
FIG. 6 a cross-sectional view of a multi-channel flat tube with a region of reduced heat transmission with isolating channels.

In FIG. 6 a flat tube 1 according to the invention is shown. It features the height H, width B and length L. The channels 2 passed by fluid extend along the length L of the flat tube 1. The flow directions 10 of the fluid in different channels 2 can be co-current or counter-current. In a heat exchanger manufacturable of flat tubes 1 according to the invention, the flow direction 11 of the fluid outside the multi-channel flat tube 1 can be along the width B of the flat tube 1. Hence cross flow develops between the heat transmitting fluids. According to the example of embodiment, several channels 2 are integrated to define channel sections 7. In the example, equal flow directions 10 are assumed within the channel sections 7. Also change of the flow direction 10 within a channel section 7, however, is possible, and is useful under certain conditions.

The individual channel sections 7 are separated from each other by isolating channels 3. The isolating channels 3 are filled with fluid or are empty, and serve to reach thermal separation of the other channels 2, or channel sections 7, respectively. In ideal case, the isolating channels 3 are established such that the heat-conductive material cross-section of the flat tube 1 becomes as small as possible at this place. The heat conduction resistance created by the material constriction leads to reduced heat conduction in direction of the width B of the flat tube 1 and, according to the example, also in direction of flow 11 of the fluid outside the flat tube 1.

Figure 7:
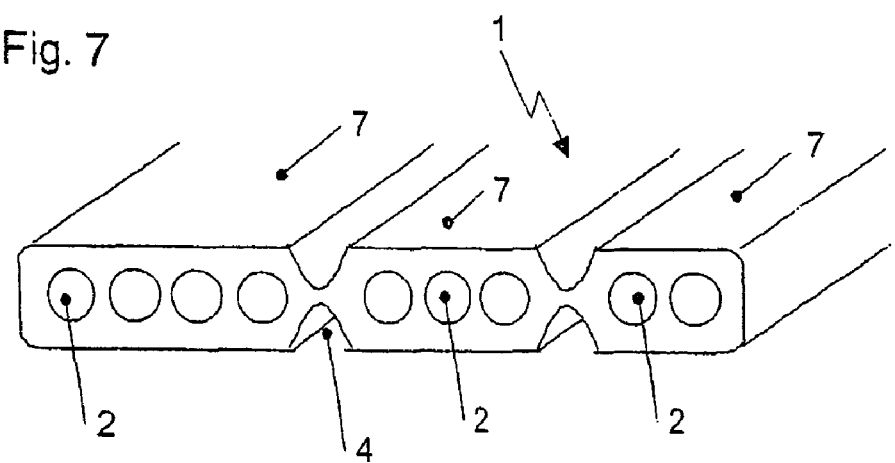
FIG. 7 a perspective and cross-sectional view of the flat tube with channel sections.

That, to FIG. 7, can be achieved by changing the number of channels with the same hydraulic diameter in the single channel sections 7. The individual channel sections 7 can consist of equal or different numbers of channels 2.

Figure 8:
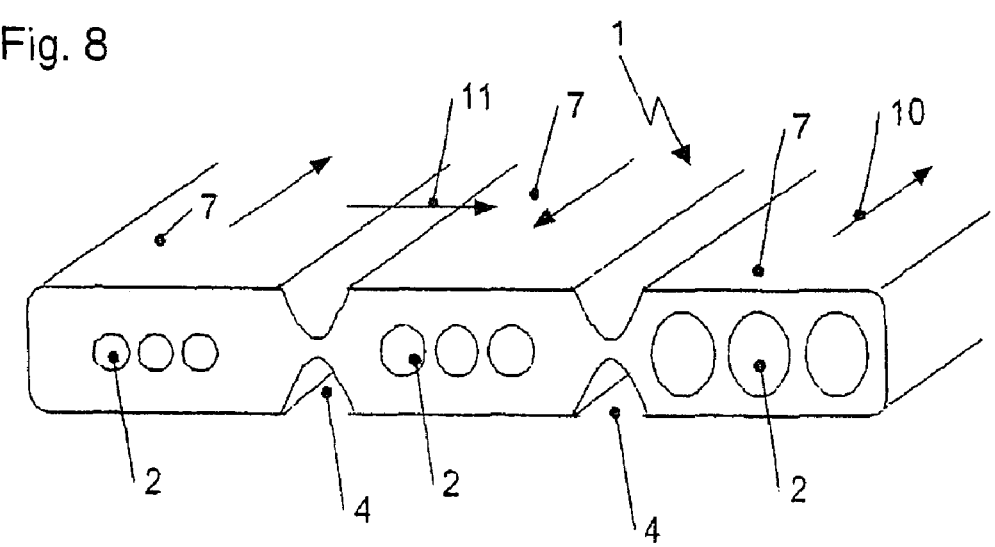
FIG. 8 a perspective and cross-sectional view of the flat tube with channel sections of different cross-sections.

Further, to FIG. 8, the flow cross-sections can also be adapted by adapting the channel cross-section, or the hydraulic diameter, respectively, in the individual channel sections 7. The channels 2 of the channel sections 7 have, dependent on the density of the fluid flowing through the channels 2, different cross-section magnitudes for the passage of fluid.

Figure 9:
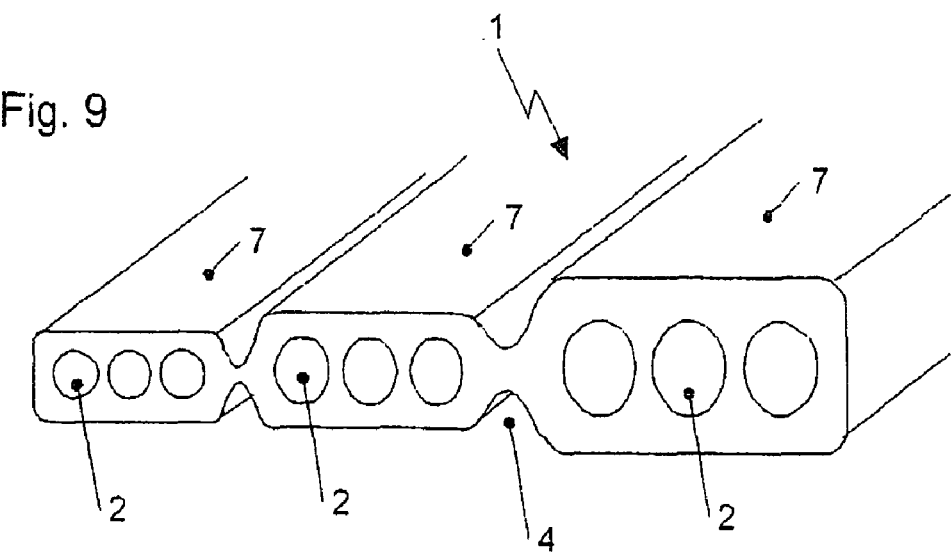
FIG. 9 a perspective and cross-sectional view of the flat tube with channel sections of different heights.

To FIG. 9, the wall thicknesses of the channel sections 7 with channels 2 of smaller hydraulic diameter are reduced for the same bursting pressure requirement in order to optimize weight and hence cost. That leads to different heights H of the flat tubes 1 in the individual channel sections 7.

From the foregoing description, one ordinarily skilled in the art can easily ascertain the essential characteristics of this invention and, without departing from the spirit and scope thereof, can make various changes and modifications to the invention to adapt it to various usages and conditions.

Nomenclature
1 multi-channel flat tube/flat tube
2 channels
3 isolating channels
4 constrictions
5 recesses
6 connecting web
7 channel sections
8 meander-shaped connecting web
9 region of reduced heat transmission
10 flow direction (10) in the channels or channel sections
11 flow direction (11) of the fluid outside the flat tube
L length
B width
H height

What is claimed is:

1. A multi-channel flat tube for heat exchangers comprising:
   a first channel section including at least one channel formed therein passable by a fluid;
   a second channel section including at least one channel formed therein passable by a fluid;
   a region of reduced heat transmission disposed between said first channel section and said second channel section, wherein said region of reduced heat transmission is formed by a constriction including a first elongate slot and a second elongate slot, the first elongate slot and the second elongate slot each disposed along an entire length of the multi-channel flat tube, the first elongate slot formed in a first side of the multi-channel flat tube and the second elongate slot formed in a second side of the multi-channel flat tube opposite the first elongate slot;
   a first isolating channel disposed in said region of reduced heat transmission, wherein said first isolating channel is an elongate conduit disposed along the entire length of the multi-channel flat tube between the first elongate slot and the second elongate slot, and
   wherein a material cross-section at said region of reduced heat transmission along the multi-channel flat tube reduced by the constriction and the first isolating channel is substantially constant along the entire length of the multi-channel flat tube.

2. The tube according to claim 1, wherein a flow through said first channel section and a flow through said second channel section are opposite in direction.

3. A multi-channel flat tube for heat exchangers comprising:
   a first channel section including at least one channel formed therein passable by a fluid;
   a second channel section including at least one channel formed therein passable by a fluid;
   a region of reduced heat transmission disposed between said first channel section and said second channel section, wherein said region of reduced heat transmission is formed by a first isolating channel,
   wherein said region of reduced heat transmission is also formed by a constriction including a first elongate slot and a second elongate slot, the first elongate slot and the second elongate slot each disposed along an entire length of the multi-channel flat tube, the first elongate slot formed in a first side of the multi-channel flat tube and the second elongate slot formed in a second side of the multi-channel flat tube opposite the first elongate slot,
   wherein said first isolating channel is an elongate conduit disposed along the entire length of the multi-channel flat tube between the first elongate slot and the second elongate slot, and
   wherein a material cross-section at said region of reduced heat transmission along the multi-channel flat tube reduced by the constriction and the first isolating channel is substantially constant along the entire length of the multi-channel flat tube.

4. The tube according to claim 3, wherein a flow through said first channel section and a flow through said second channel section are opposite in direction.

* * * * *